United States Patent [19]
Orrico et al.

[11] Patent Number: 5,884,551
[45] Date of Patent: Mar. 23, 1999

[54] MICROWAVABLE BEVERAGE MAKER

[75] Inventors: Mario Orrico, Chicago; Rou Farhadieh, Willowbrook; Rudy Avramovich, Libertyville; Stuart Koford, Oak Brook; Robert Riddell, Libertyville, all of Ill.

[73] Assignee: Micro Lungo, Inc., Chicago, Ill.

[21] Appl. No.: 819,353

[22] Filed: Mar. 18, 1997

[51] Int. Cl.⁶ ................................ A47J 31/00; H05B 6/82
[52] U.S. Cl. ............................ 99/317; 99/323; 99/33.3; 219/689; 426/433
[58] Field of Search ........................ 99/316, 317, 323, 99/323.3, 293, 295; 219/689; 426/433

[56] References Cited

U.S. PATENT DOCUMENTS

| | | | |
|---|---|---|---|
| 3,757,670 | 9/1973 | Laama et al. | 99/302 |
| 4,721,835 | 1/1988 | Welker | 99/323.3 X |
| 5,028,753 | 7/1991 | Shariat | 219/689 |
| 5,168,140 | 12/1992 | Welker | 99/323 X |
| 5,281,785 | 1/1994 | Pasbrig | 219/689 |

Primary Examiner—Reginald L. Alexander
Attorney, Agent, or Firm—McAndrews, Held & Malloy, Ltd.

[57] ABSTRACT

A removable filter compartment is filled with coffee grounds, tea, or other espresso particulate substance and mounted within a water reservoir. Water is placed in the water reservoir. A bottom cover is connected to the water reservoir to hold the filter compartment in place. Lower and upper filters are formed into the filter compartment. The lower filter may include a slotted flow distribution port extending into the interior of the filter compartment to improve the distribution of water flow. A cup-like filtrate reservoir is integrally molded to the water reservoir. A filtrate passage forms a fluid path between the filter compartment and the filtrate reservoir. A resilient gasket or valve is positioned between the filter compartment and filtrate passage. A filtrate splash cover may be attached to the upper edges of the filtrate reservoir. The assembled beverage maker is placed into a microwave oven. As water in the water reservoir begins to heat up, steam is generated, and hot water is displaced upwards through the filter compartment and particulate substance. The heated beverage is automatically emptied into the filtrate reservoir, which is designed to function as a drinking cup for individually-sized portions.

23 Claims, 7 Drawing Sheets

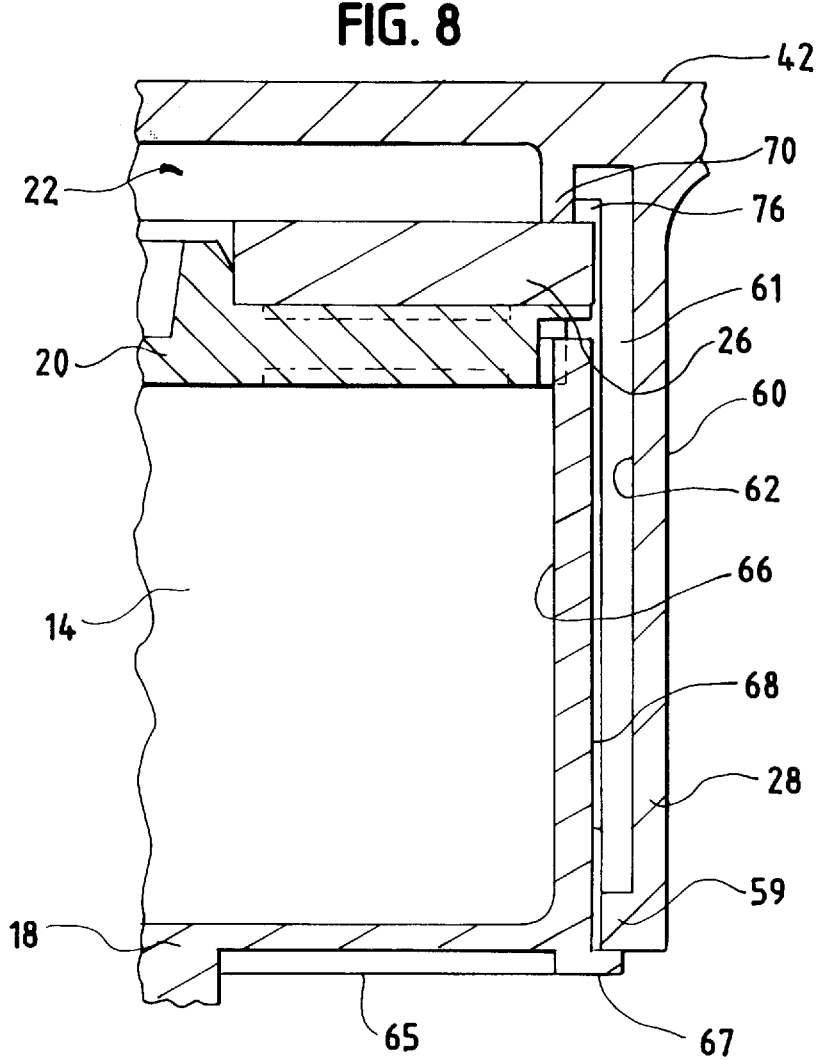
FIG. 8
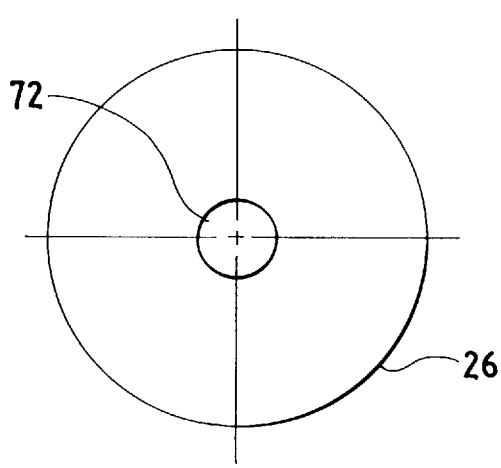
FIG. 9A
FIG. 9B

MICROWAVABLE BEVERAGE MAKER

CROSS-REFERENCE TO RELATED APPLICATIONS

This patent application describes inventions which are improvements over devices and processes invented by the same inventors and disclosed in the patent application entitled "Device and Process for Making Coffee and Espresso in Microwave Oven," Ser. No. 08/610,840, filed May 16, 1996, which is a continuation of application Ser. No. 08/458,309, filed Jun. 2, 1995, which itself is a continuation of application Ser. No. 08/037,814, filed Mar. 26, 1993.

STATEMENT REGARDING FEDERALLY-SPONSORED RESEARCH OR DEVELOPMENT

Not applicable.

BACKGROUND OF THE INVENTION

The present invention relates to an improved device and process for making coffee and espresso (sometimes called "expresso") beverages or other hot beverages, and more particularly, but not exclusively, to an improved device and process for making coffee, tea, espresso coffee, and the like for individual servings in a microwave oven.

In the beverage industry, the espresso process involves forcing hot water or steam under pressure through a particulate substance. The general method of making espresso coffee is well known. It involves the process or method of forcing hot water or steam through conventional coffee grounds or some extra fine coffee grounds. This pressure method for making coffee differs significantly from the common methods for making drip-type or percolation coffees. The espresso coffee may be brewed with a mixture of espresso coffee grounds and cinnamon or other flavored syrups such as almond, orange, hazelnut, chocolate and the like. Espresso coffee generally is a dark full-bodied brew and may also be served as cappucino, caffe latte, caffe Americano, doppio, or macchiato.

Microwave ovens are widely used and known for a variety of heating tasks, including the heating of water for instant beverages or heating other beverages and foods. In addition, several devices have been proposed for brewing coffee in microwave ovens. Several devices and processes are described in the related patent applications identified above and incorporated herein by reference.

U.S. Pat. No. 5,281,785, issued Jan. 25, 1994 (Pasbrig), discloses a device for preparing coffee or tea in a microwave oven. The device has a liquid container, a centrally-located coffee container/filter, a drink container, and a handle. The path of the pressurized heated liquid is from the closed liquid container up through the coffee container/filter into the drink container.

U.S. Pat. No. 3,757,670, issued on Sep. 11, 1973 (Laama et al), discloses a two vessel electric coffeemaker wherein water is forced from the lower metal vessel through a centrally-located coffee container to the upper metal vessel so that the percolate is collected in the upper vessel. Laama et al uses an electrical heating element integrally constructed in the base of the device.

U.S. Pat. No. 4,498,375, issued on Feb. 12, 1985 (Bedini), discloses an automatic coffeepot in which the pressurized, heated liquid is forced up through a coffee-containing filter in a manner similar to Laama et al. Bedini uses a gas flame or electric heating coil for heating the coffeemaker.

U.S. Pat. No. 4,642,443, issued on Feb. 10, 1987 (Jorgensen et al), discloses a coffee brewing appliance for making coffee by the percolation method in a microwave oven. U.S. Pat. No. 5,079,396, issued on Jan. 7, 1992 (Katz et al), also discloses a microwave coffee percolating device. These devices disclose a percolating or drip-type technique for making coffee.

U.S. Pat. No. 4,104,957, issued Aug. 8, 1978 (Freedman et al), discloses a coffee brewing appliance comprising a carafe, a filter that fits in the neck of the carafe, and a water reservoir located over the filter. The water reservoir communicates with the filter by way of a thermally-controlled valve. When water in the water reservoir is heated by microwave radiation, the valve opens, allowing the water to flow into the filter, extracting coffee constituents from coffee grounds in the filter, so that a coffee beverage accumulates in the carafe.

U.S. Pat. No. 4,577,080, issued Mar. 18, 1986 (Grossman), discloses an appliance similar to that of Freedman et al, except that instead of using a thermally-controlled valve to prevent cold water from the water reservoir from contacting coffee grounds in a filter, a body of non-toxic wax melts when the water reaches the desired temperature.

U.S. Pat. No. 4,721,835, issued Jan. 26, 1988 (Welker), discloses a device for brewing coffee in a microwave oven. The device comprises a jug having a top configured as a filter. Water and coffee grounds are placed in the jug, and the filter is fitted in the mouth of the jug. When the coffee has brewed, it can be poured from the jug, while the coffee grounds are retained by the filter.

U.S. Pat. No. 4,386,109, issued May 31, 1983 (Bowen et al), discloses an espresso coffee maker for use in a microwave oven. The water is stored in a microwave transparent reservoir which is adjacent to an aluminum pot. The pot and reservoir are coupled in a fixed spatial relationship by a collar. The collar includes a strainer which presses against a layer of coffee grounds when the collar is secured to the reservoir. The compressed coffee grounds in combination with the strainer for a pressure resistant seal over the opening of the reservoir. The water in the reservoir is heated by microwave energy. The pressure rises to a level sufficient to force steam and water in a downward direction through the coffee grounds into the pot, which stores the espresso coffee.

U.S. Pat. No. 4,381,696, issued May 3, 1983 (Koral), discloses a coffee brewing appliance that is generally similar to that disclosed by Freedman et al.

U.S. Pat. No. 4,345,512, issued Aug. 24, 1982 (Moore), discloses a tea infuser for use in a microwave oven. The tea infuser, instead of being made of metal, is made of microwave-transparent plastic material.

U.S. Pat. No. 5,012,059, issued Apr. 30, 1991 (Boatman), discloses a device for heating water in a microwave oven. In Boatman's device, water is heated in a water reservoir, then forced from the water reservoir through a tube into a heating chamber, where it is further heated prior to draining through a filter filled with coffee grounds.

U.S. Pat. No. 4,990,734, issued Feb. 5, 1991 (Hirsch et al), discloses a method of preparing coffee where a mixture of water and coffee grounds is heated with microwave radiation, whereby a pressure gradient is produced across a filter, forcing filtrate into a vessel.

German No. OS 3,206,803 includes, seated one on the other, a coffeepot, a filter to receive coffee, and a water container. The water container is pervious to microwave radiation and the filter is developed so that substantially no liquid can pass through the filter under atmospheric or ambient pressure. The device is placed in a microwave oven in which the microwave radiation brings the water in the water container to a boil, while the coffee remains screened off. The formation of steam develops such a high pressure in the water container (up to 3.45 bar) that the water is forced through the filter.

BRIEF SUMMARY OF THE INVENTION

One of the objects of the present invention is to provide a safe and convenient method and device for brewing coffee, tea, espresso coffee, or other hot beverages, as well as other espresso beverages such as cappucino, caffe latte, caffe Americano, doppio or macchiato, in a microwave oven.

Another object of the present invention is to provide a compact device for making coffee, tea, espresso beverages, or the like in a microwave oven, from which device one may conveniently drink individually-sized servings.

Still another object of the present invention is to provide a compact device for making coffee, tea, espresso beverages, or the like in a microwave oven and providing for adequate pressure-relief and/or improved pressure dissipation within the device for safety of operation.

Another object of the present invention is to provide a device for making coffee, tea, or espresso beverages in a microwave oven and providing an improvement in the consistency of brewing by providing a filter compartment which promotes constant flow of water and consistent cycle length of brewing regardless of the type of particulate substance used or degree of packing imposed on the particulate substance.

According to the present invention, a removable cylindrical filter compartment or canister is filled with coffee grounds, tea, or other espresso particulate substance, and mounted within a receptacle of a water reservoir. The water reservoir is made of a plastic microwave-transparent, pressure-resistant material suitable for use with beverages. The filter compartment has at least one filter, and preferably a lower and upper filter. The espresso particulate substance is placed on the upper surface of the lower filter. An upper filter is then positioned on the upper edges of the filter compartment, thereby enclosing and restraining the espresso particulate substance.

Integrally molded with the water reservoir is an upper filtrate reservoir or cup, handle, and a filtrate passage with opening. A resilient filter gasket or valve is placed between the filter compartment and the filtrate passage. After placing the filled filter compartment within the water reservoir receptacle, the water reservoir is filled with water. A bottom cover is threadably engaged to the water reservoir such that the filter compartment is enclosed within the water reservoir. Via the filtrate passage and opening, a fluid flow path is formed between the filter compartment and the filtrate reservoir. A filtrate splash cover is mounted on the upper edge of the filtrate reservoir.

The microwave beverage maker is placed into a microwave oven, which is then set from about two to three minutes, depending upon the power of the microwave oven, and the quantity of espresso being brewed, and sea level elevation. Microwave radiation from the microwave oven heats the water in the pressurized water reservoir, causing steam to form and water to boil. As the water in the water reservoir begins to boil, steam pressure develops and begins to displace the boiling water, causing pressurized and heated liquid and steam to rise upwards through the filters and espresso substance in the filter compartment. When the pressure rises above a threshold level of about four or five psi, the filter gasket or valve deflects or opens sufficiently to allow the pressurized beverage to pass into the filtrate passage. The pressurized beverage then flows out of the opening of the filtrate passage and into the filtrate reservoir. The coffee or espresso coffee thus is brewed. The inside surface of the upper filtrate surface or cup may be lined with preformed aluminum or other metallic surface or microwave reflective materials to shield the brewed liquid from the microwave energy.

The filter compartment can be provided with a lower filter specially designed to improve the distribution of water within the filter compartment and to help dissipate any buildup of pressures. A substantially cylindrical flow distribution port extends from the upper surface of the lower filter into the interior of the filter compartment. The flow distribution port is open on the bottom and has flared slots or openings spaced circumferentially along the length of the cylindrical surface. The top of the flow port is preferably domed-shape, although other shapes are appropriate. The slots or openings are sufficiently sized to allow the flow of water and steam therethrough and into the interior of the filter compartment containing the espresso particulate substance. Water and steam enter the flow distribution port through an open bottom. The flow distribution port further provides improved consistency to the brewing process for many sizes of espresso or coffee grounds and different degrees of packing of the grounds. After the brewing cycle is completed, the specially designed filter compartment dissipates internal pressure within seconds.

In the event of overheating on an extensive buildup of pressure within the espresso device, a pressure relief mechanism may be provided. A resilient filter gasket or valve is positioned between the filtrate passage and the filter compartment located within the water reservoir receptacle. At least one steam release passage is provided between the outer cylindrical surface of the filter compartment and the inner cylindrical surface of the water reservoir receptacle. The filter gasket, in conjunction with the steam release passage or passages, serves as a pressure relief mechanism. Upon high pressure, the gasket deforms and permits a release of high pressure steam from the water reservoir into the filtrate passage and opening into the filtrate reservoir or cup which is open to the atmosphere.

The filtrate splash cover serves as a splash guard to prevent release of bubbles or pressurized fluid into the microwave oven. The splash cover also provides for venting. Upon removal of the filtrate splash cover or through a formed opening in the splash cover, the espresso may be imbibed directly from the filtrate reservoir, which is designed to function as a drinking cup. A handle or insulation jacket is affixed to the exterior surface of the espresso device for handling and lifting the hot device.

The present invention thus provides a simple, safe, inexpensive, and convenient means for brewing coffee, tea, and espresso beverages in the microwave oven. It further provides a compact device useable as a drinking cup for individual-sized servings. Other objects, advantages, and novel features of the present invention will become apparent from the following description and drawing.

BRIEF DESCRIPTION OF THE DRAWINGS

FIG. 8 is a detail of one embodiment of a pressure relief mechanism.

FIGS. 9A and 9B is a plan and cross-sectional view of the filter gasket or valve.

DETAILED DESCRIPTION OF THE INVENTION

Figure 1:
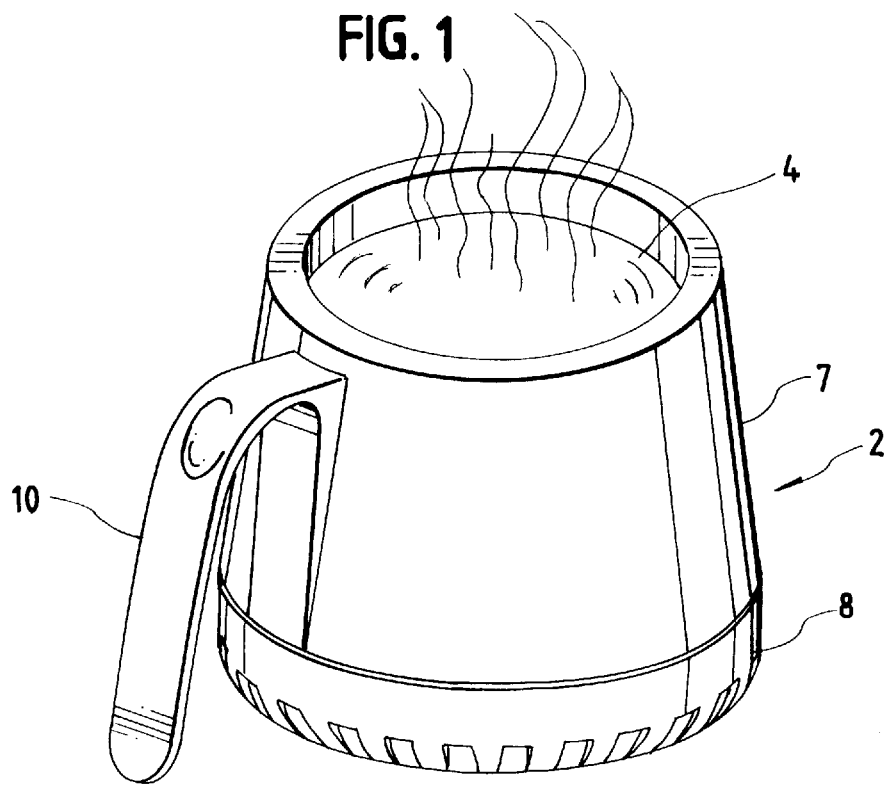
FIG. 1 is a perspective view of one embodiment of a microwave beverage maker filled with brewed fluid.
Figure 2:
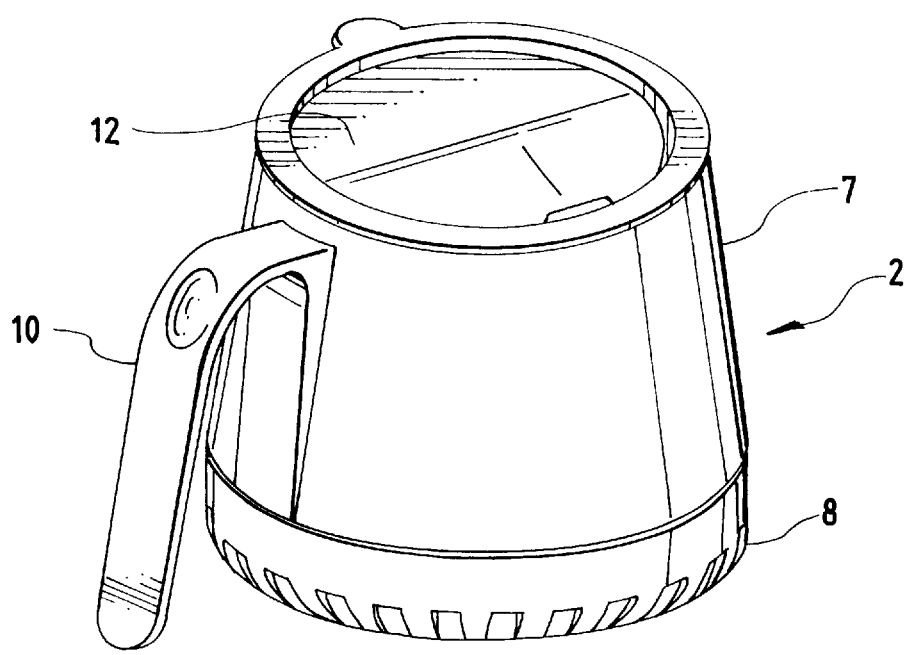
FIG. 2 is a perspective view of one embodiment of a microwave beverage maker with a filtrate splash cover.

Referring to FIG. 1 and FIG. 2, there is generally shown a microwave beverage maker 2 embodying the invention. The beverage maker 2 generally includes an upper cup assembly 7, a bottom cover 8, and a handle 10. FIG. 1 shows the beverage maker 2 having liquid 4 ready to be consumed; FIG. 2 shows the beverage maker 2 having a filtrate splash cover 12. The beverage maker 2 is generally constructed of a plastic microwave-transparent, pressure-resistant material suitable for contact with beverages. By microwave-transparent, it is meant that microwave energy will pass through the material without substantial loss of energy.

Appropriate materials include PET® polyethylene terephthalate, polyester, ULTEM® polyether imide, polysulphane, or ULTEM® LTX Series polyether imide-polycarbonate blend.

Figure 3:
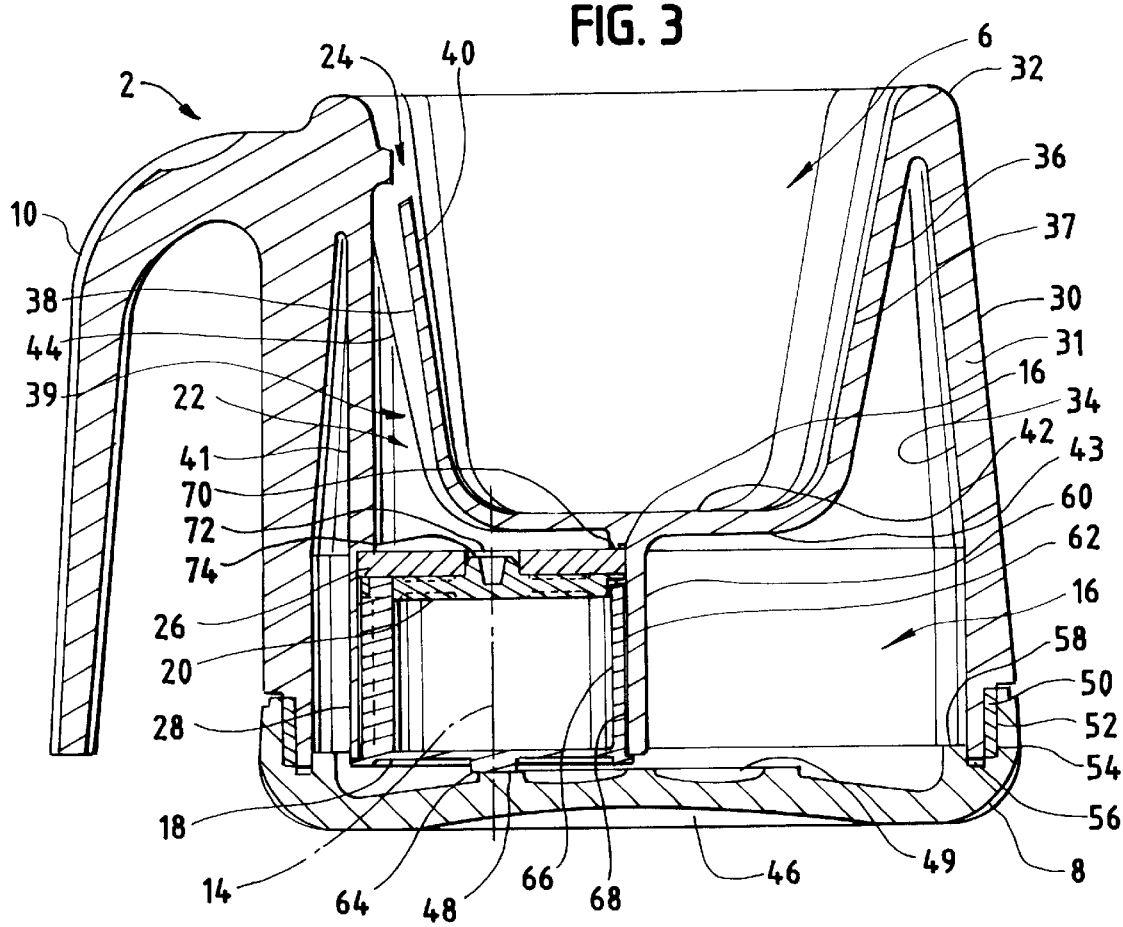
FIG. 3 is a cross-sectional view of one embodiment of a microwave beverage maker.

Referring to FIG. 3, the beverage maker 2 includes a generally cylindrical water reservoir 16 having a receptacle 28 for receiving a filter compartment 14; the filter compartment 14 holding coffee grounds, tea, or other espresso particulate substance; a generally cup-like filtrate reservoir 6, which is integrally molded to the water reservoir 16; a filtrate passage 22 having a lower annular ledge 70 for conducting steam and water from the filter compartment 14 within the water reservoir 16 to the filtrate reservoir 6; a filter gasket or valve 26 inserted between the filter compartment 14 and the filtrate passage 22; and a detachable filtrate splash cover 12 (not shown on FIG. 3). The general shape of the components as well as whether the components are integrally molded together or are multiple affixed pieces are matters of design choice.

The water reservoir 16 is threadably and releasably engaged to the bottom cover 8 at threaded connection 52. Other well-known mechanisms of attachment are suitable. This engagement engages the removable filter compartment 14 and filter gasket or valve 26 between the lower annular ledge 70 of the filtrate passage 22 and an upper support surface 48 of the bottom-cover 8. A ring-shaped grooved depression 49 is formed in the upper, central portion of the bottom cover 8 to provide a passage for fluid from the water reservoir 16 in a direction up through the filter compartment 14.

Figure 15:
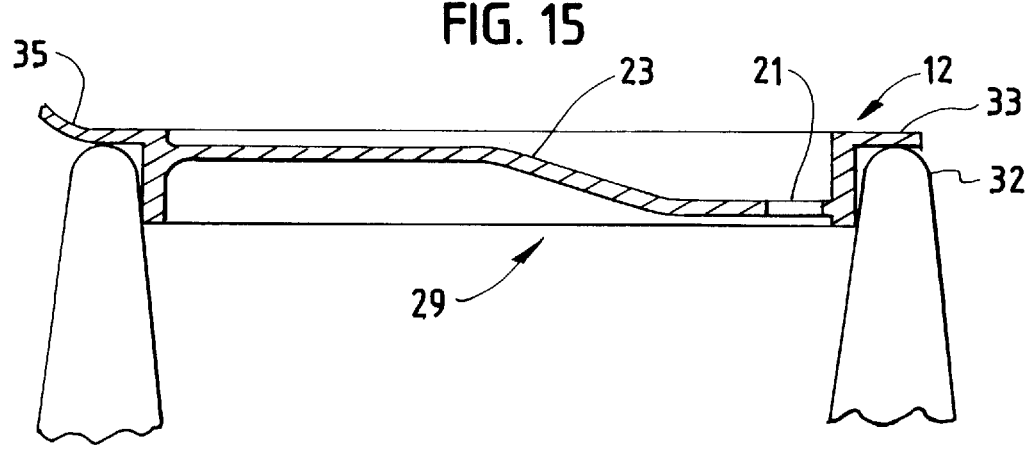
FIG. 15 is a cross-sectional view of another embodiment of a filtrate splash cover.

The filter compartment 14 is generally cylindrical, although other configurations are suitable, and includes a lower filter 18 and a upper filter 20. The filters 18, 20, may be removable from the filter compartment 14. The filtrate passage 22 is formed by passage interior surface 38, passage side walls 39, and passage back wall 41 integrally molded within a portion of the water reservoir 16. One embodiment of the filtrate splash cover 12 shown in FIGS. 11–14 includes a cover section 86 and a splash guard 88. The water reservoir 16 provides a pressurized chamber for the containment of steam and liquid during the espresso making process. The filtrate splash cover 12 acts as a splash guard, breaks down bubbles, and provides for venting. The filtrate reservoir or cup 6, after removal of filtrate splash cover 12, provides a means for direct consumption of the finished beverage. Alternately, the filtrate splash cover 12 as shown in FIG. 15 may include integral openings for sipping of the finished beverage without removal of the filtrate splash cover 12. The espresso device may be sized preferably for an individual serving.

To operate, ground coffee, tea, or other espresso particulate substance, either loose, in a porous block form, or contained in a paper bag or other filter, is placed within the filter compartment 14 on the upper surface of the lower filter 18. Paper filters could be approximately 20 microns. The circular upper filter 20 is reconnected or attached to the upper edges of filter compartment 14. The filter compartment 14 is placed within the receptacle 28 of the water reservoir 16 such that the filter compartment 14 is located generally in the flow path between the filtrate passage 22 and water reservoir 16. The filters 18 and 20 may be shapes other than circular, and the use of one may be appropriate. A suitable quantity of water is poured into the water reservoir 16, and the annular end portion 54 of the circular bottom cover 8 is threadably connected at threaded connection 52 to the annular indentation 50 of the water reservoir 16. Annular indentation 50 fits within annular channel 56 formed by annular ledge 58 and annular end portion 54 of the bottom cover 8. The filter gasket 26 or valve forms a substantial seal or seat between the filtrate passage 22 and the filter compartment 14. The filtrate gasket or valve 26 substantially closes the path for passage of liquid and steam from the filter compartment 14 to the filtrate passage 22. The filtrate splash cover 12 is detachably engaged with the upper edge 32 of the filtrate reservoir 6.

Upon application of the microwave energy, the water in the water reservoir 16 heats up, vapor forms, and the pressure increases. When the pressure within the filter compartment 14 reaches a level of approximately 5 psi, the steam pressure in the water reservoir 16 pushes the gasket or valve 26 away from the upper filter 20 near the upper mounting post 74 to provide an opening. The steam pressure further forces hot liquid and steam to rise upwards through the lower filter 18, espresso particulate substance, upper filter 20, the filtrate passage 22, and opening 24 and into the filtrate reservoir 6. The filtrate splash cover 12 serves to break up bubbles and deflect liquid into the filtrate reservoir 6 and to contain steam within the filtrate reservoir, where it may cool and condense. The filtrate splash cover 12 thereby limits the undesired escape of fluid and steam into the microwave oven. The process continues until most of the water has been discharged into the filtrate reservoir 6. Espresso may be brewed in approximately two to three minutes, depending upon the power of the oven, the quantity of espresso being brewed, and the atmosphere conditions. The filtrate reservoir 6 may be lined partially or entirely on the front side or back side with aluminum, other metallic substance or microwave reflective materials (not shown) to shield the brewed liquid from the microwave energy and control any overheating of the brewed coffee or espresso. A preformed aluminum cup-like liner may be fitted against the inner cup surface 40 and bottom cup wall 42 of the filtrate reservoir or cup 6. A similar aluminum liner can be added to the splash cover 12, in combination with shielded side or sloping cup walls and bottom cup wall, to render the filtrate reservoir 6 practically impenetrable to the microwave energy.

Referring to FIG. 3, the water reservoir 16 is formed by a generally cylindrical wall 31 having exterior surface 30 and interior surface 34. Filtrate reservoir 6 is integrally connected to the water reservoir 16 along the annular upper edge 32. The handle 10 also is integrally connected to the cylindrical wall 31 of the water reservoir. The filtrate reservoir 6 is formed by the downwardly, inwardly sloping cup wall 37 and bottom cup wall 42 which are connected together. The filtrate opening 24 is formed in cup wall 37 at a location generally aligned with the handle 10. The cup wall 37 has an inner cup surface 40 and an outer cup surface 36. The bottom cup wall 42 has a bottom surface 43. The outer cup surface 36 and bottom surface 43 form the upper boundary for the filtrate passage 22 at passage interior surface 38 and for the water reservoir 16 in general. The bottom cover 8 may have a convex outer surface 46 to improve stability of the beverage maker 2 when placed on a surface.

As shown in FIG. 3, the water reservoir receptacle 28 is generally cylindrical and is integrally connected to the passage back wall 41 and the bottom cup wall 42. The back wall 41 is integrally connected to the upper portion of cylindrical wall 31. Alternatively, the water reservoir receptacle 28 may be located coaxially with the filtrate reservoir 6 or offset any desired amount from the central axis of the beverage maker 2 in general.

The receptacle 28 includes inner receptacle surface 62 and outer receptacle surface 60 to form a pocket for removably fitting the filter compartment 14. The receptacle 28 may utilize any alternative configuration or structure to hold or align the filter compartment 14 in place. As shown in FIG. 8, an annular channel 76 is formed by an annular ledge 70 and the connection of the receptacle 28 to the passage back wall 41 (not shown) and bottom cup wall 42.

Referring to FIGS. 3–7, the filter compartment 14 has an inside diameter which is generally constant. The compartment 14 may be fixed or self-contained and removable. The cylindrical filter compartment 14 has a cylindrical wall 63 defined by an outer compartment surface 68 and an inner compartment surface 66. An upper annular ledge 81 is formed at the top of cylindrical wall of the filter compartment 14. Although the filter compartment 14 is shown as cylindrical, other shapes may be used.

Figure 5:
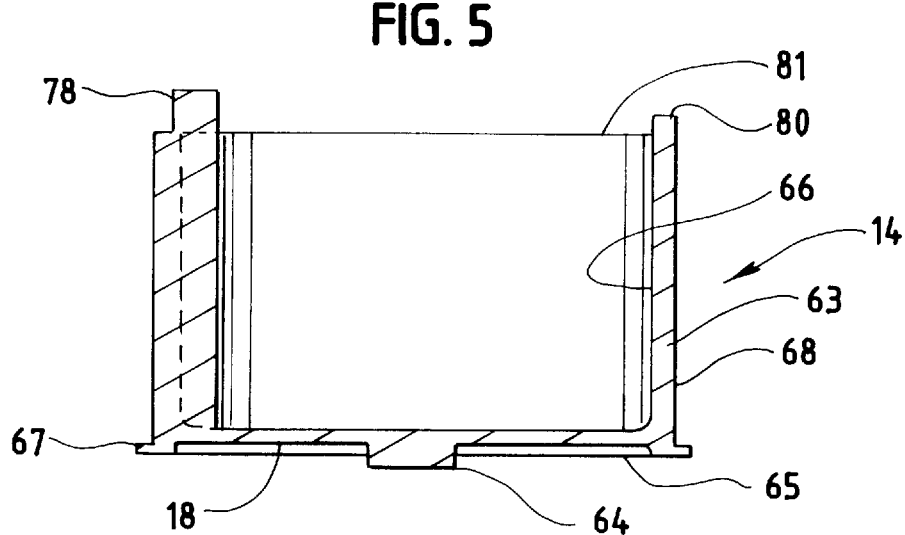
FIG. 5 is a cross-sectional view of one embodiment of a filter compartment.
Figure 6:
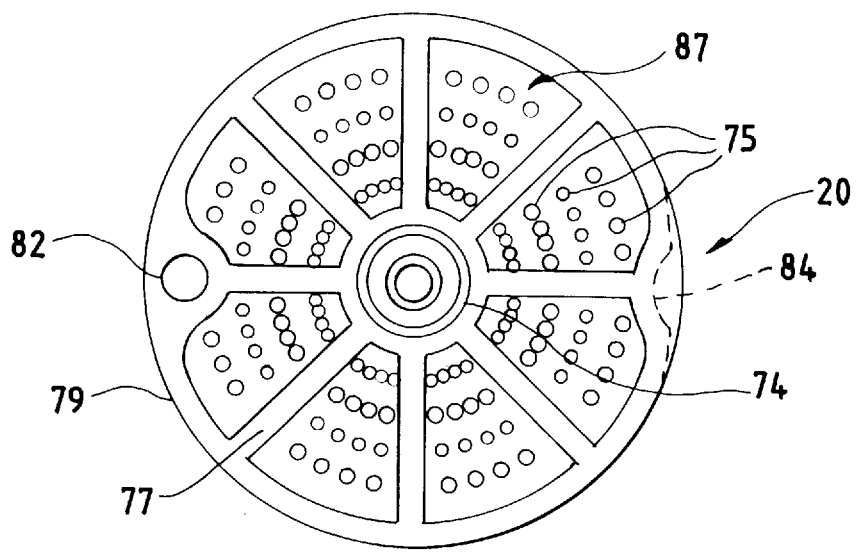
FIG. 6 is a plan view of one embodiment of an upper filter.
Figure 7:
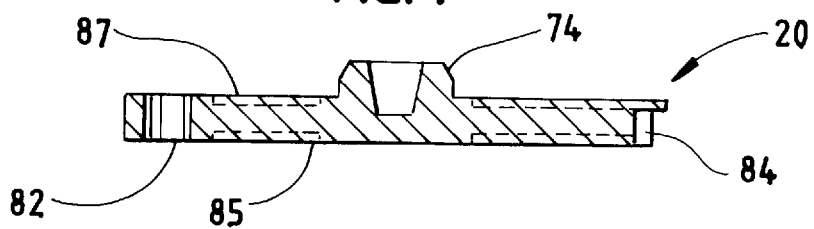
FIG. 7 is a cross-sectional view of one embodiment of the upper filter.

An upper filter 20 is attached to the filter compartment 14 at pin 78 and is seated on upper ledge 81 during operation. Pin 78 is attached to the cylindrical wall 63 or alternatively to the upper ledge 81 of the filter compartment 14. Referring to FIGS. 5–7, the upper filter 20 is capable of sliding along the upper ledge 81 and swiveling about pin 78 at connection 118 for access into the inside of compartment 14. The upper filter 20 has support ribs 77 extending in a spaced radial direction on the upper and lower sides of the filter, an outer support ring 79, and a pin opening 82. Recessed surfaces 85 and 87 preferably are located within a substantial portion of the areas defined by the support ribs 77 and support ring 79. Pin 78 mates with pin opening 82. The upper filter 20 has an outside diameter which is substantially the same as the outside diameter of the upper portion of the filter compartment 14, except there is a cutout portion 84 formed out of the outer support ring 79 which cooperates with pin 80 mounted on the upper ledge 81 of the filter compartment 14. This connection permits the snapping into place for operation, and subsequent swiveling of the upper filter 20. In another alternative (not shown), the upper filter may be hinged to the filter canister or removable completely from the filter canister. Other mechanisms or structures to mount or place the upper filter may be suitable.

Figure 4:
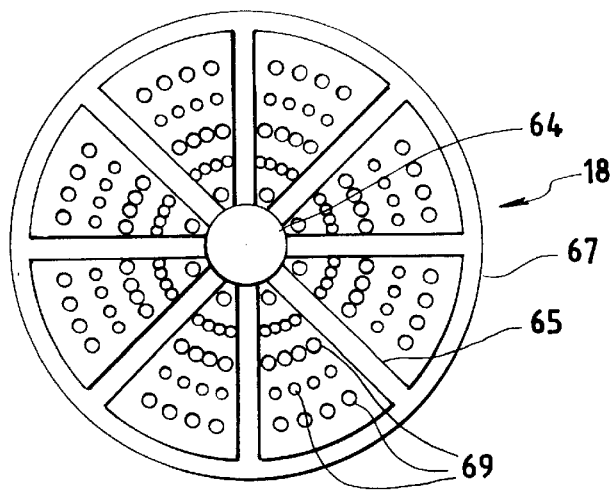
FIG. 4 is a plan view of one embodiment of a lower filter.

Referring to FIG. 4, a lower filter 18 is integrally formed in the filter compartment 14. Alternatively, the lower filter 18 may be detachable from the filter compartment. The lower filter 18 has support ribs 65 extending in a spaced radial direction, an outer circular support ring 67, and a centrally located, downwardly extending support post 64 for engagement with the upper support surface 48 of the bottom cover 8.

During the brewing process, the self-contained filter compartment 14 offers additional flexibility in that it can be removed from the water reservoir receptacle 28 to simplify the placement of loose espresso particulate substance, loose coffee grounds, tea, or filter bags or packets into the canister. The upper filter 20 swivels to an open position for the placement of particulate and then snaps back into place. The lower filter 18 is conveniently molded integrally into the canister. After the filter compartment 14 is placed back into the pocket of the water reservoir receptacle 28, the espresso process will proceed as previously described. Alternatively, although not shown, designed access to the filter compartment may be accomplished from the top of the beverage maker by way of through the bottom cup wall 42 of the filtrate reservoir or cup 6.

The filter gasket or valve 26 is made of a resilient material such as food grade silicon rubber. The gasket or valve 26 is designed to fit within an annular space of the water reservoir receptacle 28 between the ring annular ledge 70 and the top surface of the upper filter 20. The arrangements shown in FIGS. 3, 8, and 16, where the gasket has a hardness of approximately 60 durameters, were found to provide pressure relief at approximately 50–60 psi. Other gasket hardnesses or pressure relief settings are appropriate depending on the circumstances and design considerations. It should be noted that the outside diameter of the gasket 26 is somewhat greater than the outside diameter of the annular ledge 70, thereby covering or overlapping the opening to the filtrate passage 22. When the bottom cover 8 is threaded to the water reservoir 16, the removable gasket 26 is held in position. The gasket 26 has a centrally located opening 72.

Referring to FIGS. 8 and 9, the pressure relief mechanism includes the filter gasket or valve 26 and a pressure release channel 61 formed between the inner receptacle surface 62 and the outer compartment surface 68. The pressure release channels 61 may vary in number, although the use of eight channels circumferentially spaced around the water reservoir receptacle 28 is typical. In the abnormal situation, when pressure in the water reservoir 16 exceeds a certain limit, preferably in the range of 40 to 60 psi, steam escapes through the opening 59 up the pressure release channel 61, around the filter gasket 26 which resiliently deforms downward at the annular ledge 70, through the filtrate passage 22 and opening 24 into the filtrate reservoir 6.

Figure 16:
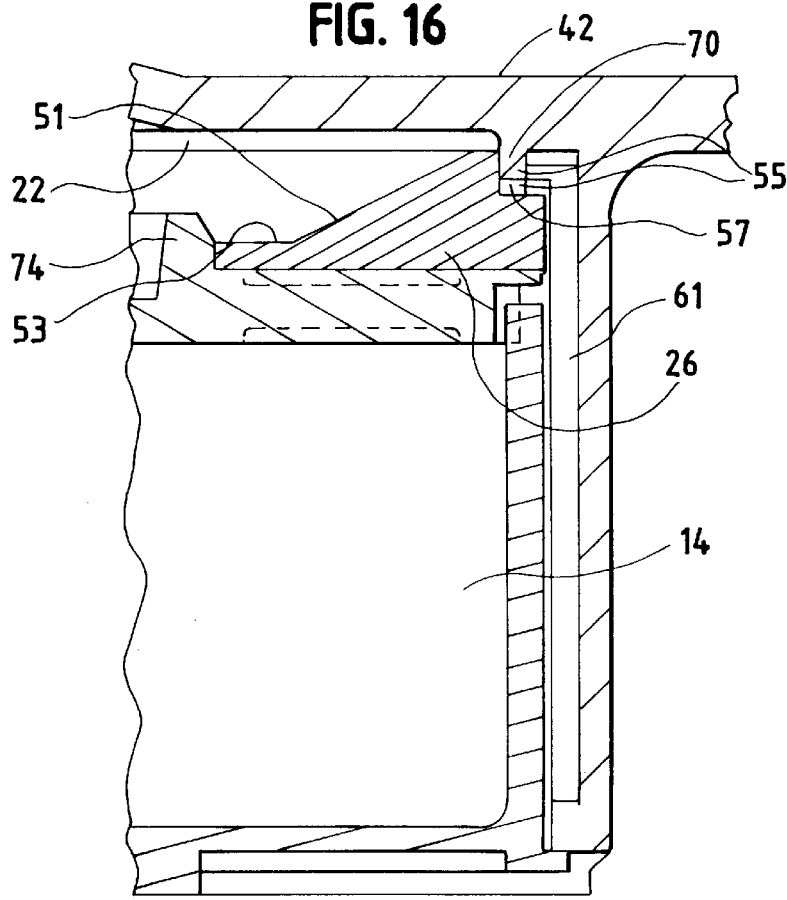
FIG. 16 is a partial cross-sectional representation of another embodiment of the filter gasket or valve of a microwave beverage maker.

An alternate configuration for the filter gasket or valve 26 is shown in FIG. 16, which shows a partial cross-section of the gasket. This configuration of the filter gasket or valve 26 is preferred and provides improved gasket deflection both for normal operation and for pressure relief of the flow of pressurized fluid from the water reservoir to the filtrate passage. The filter gasket or valve 26 depicted in FIG. 16 is ring-shaped in its configuration. The gasket 26 has an upper surface having an annular notch 55 at its circumference. The vertical leg of the annular notch 55 is positioned against a side of the annular ledge 70. The horizontal leg of the annular notch 55 is spaced from the bottom of the annular ledge 70 so as to form a channel 57. The top surface of gasket 26 further is generally inclined downwardly in a radial direction from the circumference towards the center of the gasket 26.

The filter gasket or valve 26 depicted in FIG. 16 operates in a fashion similar to that described above for normal flows and pressure relief. During the normal brewing process, the portion of the gasket or valve 26 near the upper mounting post 74 deflects upward when the pressure within the filter compartment 14 reaches a level of four or five psi. This allows the pressurized fluid and steam to flow from the filter compartment into the filtrate passage 22. In the abnormal situations when there exists a large pressure buildup in the water reservoir 16 in the range of 40 to 60 psi, the pressurized water and steam will bypass the filter compartment 14 by flowing through the pressure release channel or channels 61, around the filter gasket 26 which resiliently deforms at the annular notch 55 away from the annular ledge 70, through the filtrate passage 22 and opening 24 into the filtrate reservoir 6.

Referring to FIG. 6, the upper filter 20 has a plurality of openings or perforations 75 of a size and number sufficient to retain the espresso particulate substance, while allowing passage of steam and water. The size of the openings preferably can range from 0.020 to 0.040 inches in diameter; although other sizes may be suitable depending on the size of the particulate substance; the number of openings can range from 100 to 150. The preferred opening sizes are an equal combination of 0.032 inches and 0.040 inches in diameter, and the typical number is 124. A central upper mounting post 74 defined by the central upstanding portion of upper filter 20 is sized to fit within the central opening 72 of filter gasket 26 while permitting the flow of brewed fluid around the circumference of the upper mounting post 74.

Referring to FIGS. 4 and 5, the lower filter 18 has a plurality of openings or perforations 69 of a size and number sufficient to allow free movement of steam and water, while retaining coffee grounds or other espresso particulate substance. The size of the openings can range from 0.032 to 0.065 inches in diameter; the number of openings typically can range from 100 to 150. The typical opening size is 0.035 inches, and the typical number is 124.

Figure 10:
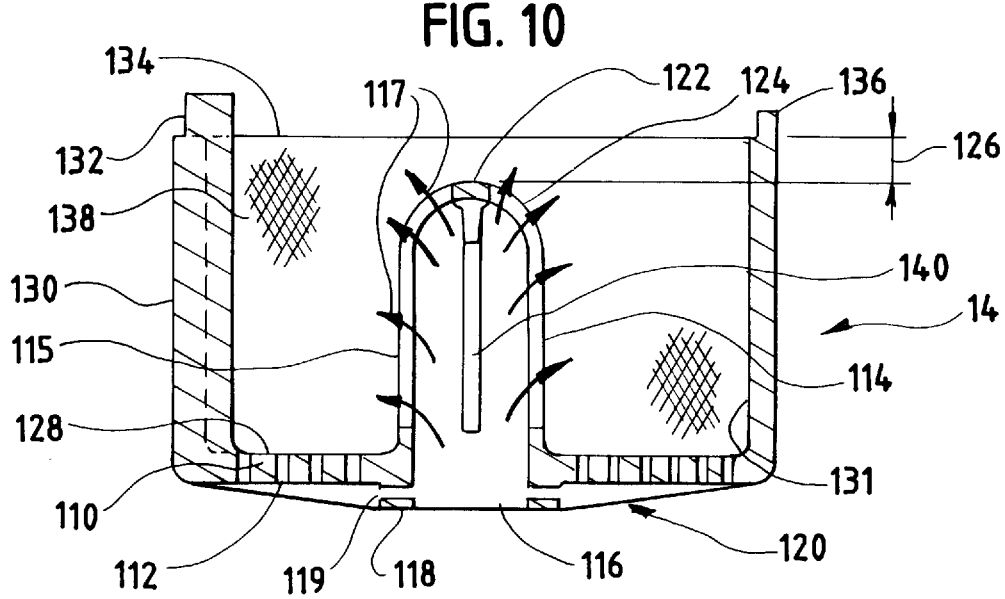
FIG. 10 is a cross-sectional view of another embodiment of a filter compartment without an upper filter.
Figure 11:
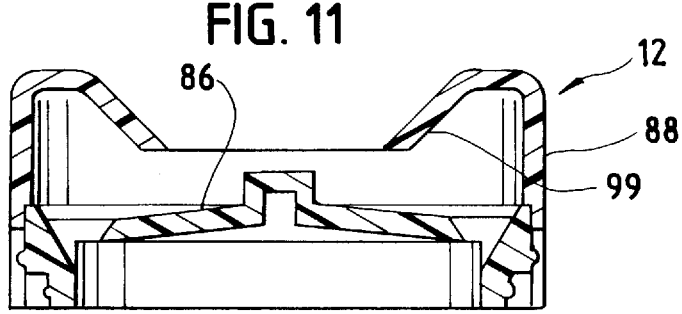
FIG. 11 is a cross-sectional representation of one embodiment of the filtrate splash cover.
Figure 12:
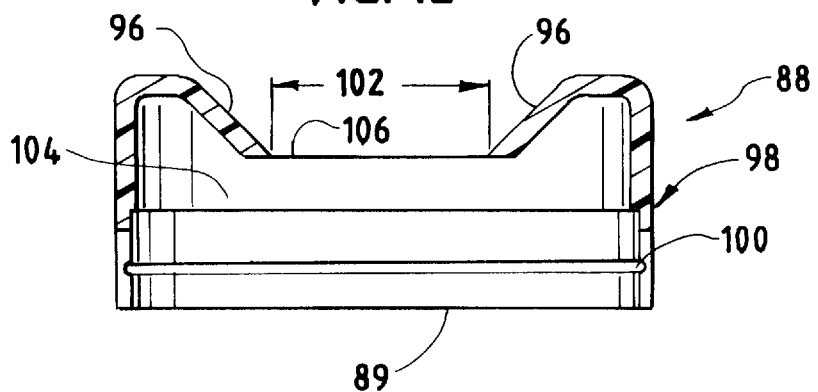
FIG. 12 is a cross-sectional representation of one embodiment of the splash guard section of the filtrate splash cover.
Figure 13:
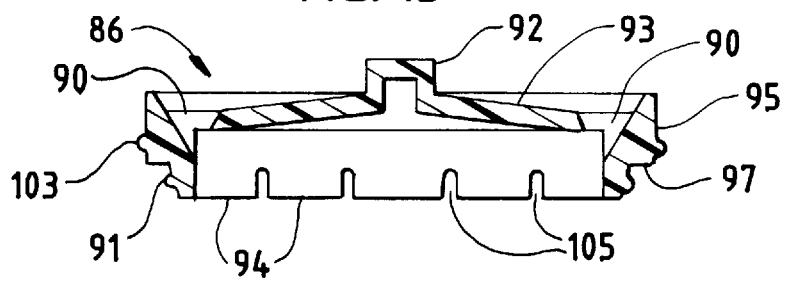
FIG. 13 is a cross-sectional representation of one embodiment of the cover section of the filtrate splash cover.
Figure 14:
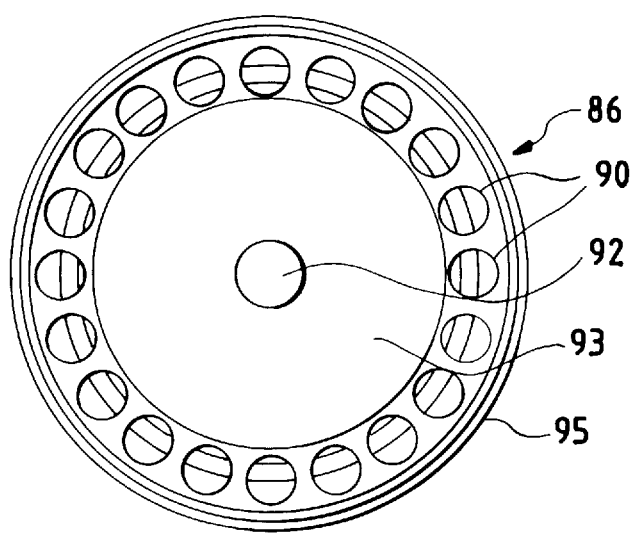
FIG. 14 is a plan view of the cover section of FIG. 13.
Figure 17:
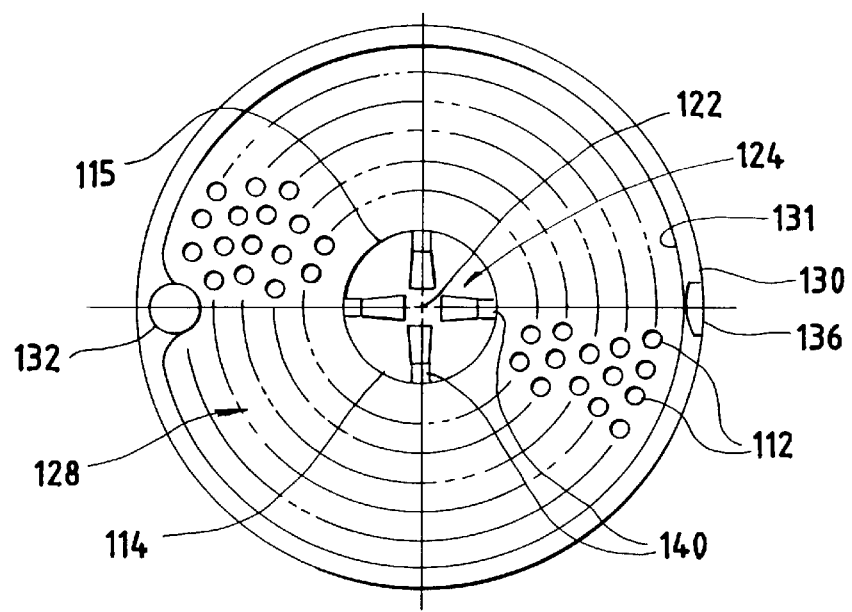
FIG. 17 is a plan view of the embodiment of the filter compartment depicted in FIG. 10.

Referring to FIGS. 10 and 17, another embodiment of a removable filter compartment 14 is disclosed. The upper filter 20 is not shown on FIG. 10 for clarity and could be similar in structure and attachment means as described above in connection with FIGS. 5, 6, and 7. The filter compartment 14 is generally cylindrical and includes an annular upper ledge 134, inner compartment wall 131, outer compartment wall 130, pins 132, 136, and a lower filter 110 having openings or perforations 112 similar to that shown in FIG. 4. The lower filter 110 may include a plurality of circumferentially spaced support webs 120. The lower filter 110 further includes an upwardly extending generally cylindrical flow distribution port 114. The flow port 114 extends from the bottom of the filter compartment 14 to an offset distance 126, which preferably is about 0.150 inches below the upper annular ledge 134 of the filter compartment 14.

The flow distribution port 114 includes a bottom flow port opening 116 which is centrally located in the lower filter 110. An annular support ring 118 forms the opening 116 preferably of about 0.28 inches in diameter. The support ring 118 further engages the upper support surface 48 of the bottom cover 8 in a manner described above. The support ring 118 has a plurality of circumferentially spaced openings 119 which allow the ingress of water from the water reservoir 16. The flow distribution port 114 terminates at end 122 in a domed top 124, although other configurations may be suitable. Elongate slots 140 are formed in the cylindrical wall 115 of the flow distribution port 114. The slots 140 are circumferentially spaced around the port 114. Preferably, four slots 140 are provided; the slots 140 converge in a flared shape from an approximate opening size of 0.060 inches at the interior of the cylindrical wall 115 to an approximate opening size of 0.035 inches at the exterior of the cylindrical wall 115.

Espresso particulate substance 138 is placed on the upper surface 128 of the lower filter 110. The flow distribution port 114 allows the flow of water into the espresso particulate substance at various locations throughout the depth of the compartment as shown by the flow arrows 117 on FIG. 10. This feature provides one or more of the following advantages: (1) improves the water exchange rate with the coffee by reducing channelization of flows; (2) dissipates any buildup of pressures caused by packed coffee grounds or other blockages near the upper surface 128 of the lower filter 110; and (3) improves the consistency of the brewing cycle among different sizes of coffee grounds or variable degrees of packing. The flared slots 140 enhance cleaning while reducing any clogging caused by the particulate substance.

Referring to FIGS. 11 through 14, one embodiment of filtrate splash cover 12 includes the cover section 86 and splash guard 88, which when combined are removably mounted upon the upper edge 32 of the filtrate reservoir 6. The cover section 86 has a plurality of vent holes 90, lift knob 92, deflector portion 93, and annular ring 95. The annular ring 95 includes a notch 97 for cooperating mechanically with upper edge 32 of the filtrate reservoir 6. The splash guard 88 includes approximately eight fingers 94 and splash baffle 96. More or less fingers may be appropriate depending upon the design. The lower edge 95 of the splash baffle 96 connects to the fingers 94. Each of the fingers has projecting tips 91 designed to releasably grip the upper edge 32 of the filtrate reservoir 6. The fingers 94 define slots 105, which allow the fingers 94 to move independently of one another. The annular ring 95 of the cover section 86 includes an annular boss 103 designed to releasably grip the annular slots 100 located on the inside wall section 98 of the splash guard 88. Alternative releasable gripping arrangements may be used. An upper, inside edge 106 of the splash baffle 96 defines a downwardly extending angular surface 99 for deflecting downward the liquid which passes through the vent holes 90 of the cover section and a central orifice 102, which vents the beverage maker 2. An annular ledge 104 on the inside of the splash guard 88 is designed to hold the cover section 86 in place during microwave heating. The bottom surface 89 of the splash guard preferably extends below and surrounds the upper edge 32 of filtrate reservoir 6. The filtrate splash cover 12 serves to deflect pressurized liquid into the filtrate reservoir 6, to limit the escape of steam, to further depressurize the liquid, and to break up bubbles formed during the brewing process, all designed to prevent or minimize the spraying or spillage of liquid into the microwave during the heating process.

Referring to FIGS. 2 and 15, another plastic embodiment of the filtrate splash cover 12 is shown. The splash cover 12 includes an annular rim 33 having a downward connected annular web 29. The rim 33 and web 29 fit snugly and detachably within the opening formed by the upper edge 32 of the filtrate reservoir 6. A finger tab 35 is formed within the rim 33 to aid the detachment of the splash cover 12 from the filtrate reservoir 6. A top surface 23 having a sip hole 21 extends within the area defined by the annular rim 33. The top surface 23 may be formed with a depression around the sip hole 21 to capture and contain spilled liquid. Any other standard or typical type of splash cover may be suitable.

It will be appreciated that the present invention is not restricted to the particular embodiment or dimensions that has been described and illustrated, and that variations may be made therein without departing from the scope of the invention as defined in the appended claims and equivalents thereof. For example, multiple piece components may be utilized in lieu of an integrally molded assembly. Alternate types of filter splash covers can be used. Different shapes and configurations of the filter compartment, filters, water reservoir, water reservoir receptacle, filtrate passage, filtrate reservoir, bottom cover, and handle may be used as a matter of design choice to practice the present invention.

What is claimed is:

1. A beverage maker for making individually-sized servings of heated beverages in a microwave oven, the beverage maker having: a water reservoir capable of containing a liquid; a filter compartment for holding a particulate substance and having at least one filter for substantially retaining the particulate substance while permitting the passage of liquid and steam; the filter compartment mounted within the water reservoir; a bottom cover connected to the water reservoir; a cup-like filtrate reservoir integrally connected to the water reservoir, a filtrate passage integrally formed by the water reservoir and filtrate reservoir; and a filtrate splash cover detachably connected to the filtrate reservoir for deflecting liquid into the filtrate reservoir, whereby, upon heating with microwave energy, the liquid and steam located in the water reservoir is pressurized and directed through the filter compartment containing the espresso particulate substance, the filtrate passage, and into the filtrate reservoir.

2. The beverage maker of claim 1 wherein a filter gasket is positioned between the filter compartment and the filtrate passage, the filter gasket deflects upward at a predetermined pressure within the filter compartment thereby acting as a valve to permit the flow of liquid and steam from the filter compartment into the filtrate passage.

3. The beverage maker of claim 1 wherein the filter compartment includes an upper filter and a lower filter with the particulate substance positioned intermediate the filters, the filters having a plurality of openings which permit the passage of liquid and steam.

4. The beverage maker of claim 3 wherein the filter compartment is a removable self-contained canister.

5. The beverage maker of claim 3 wherein the upper filter has openings of at least two different sizes to reduce the potential for blockage of substantially all openings by the particulate substance of a particular coarseness.

6. The beverage maker of claim 5 wherein the openings of the upper filter have sizes of the combination of 0.032 inches and 0.040 inches in diameter.

7. The beverage maker of claim 1 wherein the filter compartment includes lower filter means for distributing the flow of liquid directly within the central portion of the filter compartment.

8. The beverage maker of claim 7 wherein the filter compartment includes a substantially cylindrical flow distribution port extending from the lower filter into the interior of the filter compartment, the flow distribution port having an open bottom for receiving pressurized fluid and steam and at least one elongate slot spaced along a portion of the flow distribution port which serves as an opening for the flow of pressurized fluid and steam into the central portion of the filter compartment.

9. The beverage maker of claim 1 wherein the water reservoir and filtrate reservoir form a cup assembly, a handle is attached to the cup assembly.

10. The beverage maker of claim 1 wherein the device includes means for relieving pressure within the device during heating in a microwave oven.

11. The beverage maker of claim 10 wherein the pressure relieving means includes a receptacle formed in the water reservoir, the receptacle receives the filter compartment, a filter gasket positioned between the filtrate passage having an annular ledge and the filter compartment, and at least one pressure relief channel, the pressure relief channel formed between an outer compartment surface of the filter compartment and an inner receptacle surface of the receptacle with an opening into the water reservoir, the gasket normally overlapping the annular ledge and preventing liquid flow between the annular ledge and the gasket whereby upon a pressure exceeding a predetermined level in the water reservoir, the gasket will deform resiliently to open a passageway for liquid and steam through the pressure relief channel, around the annular ledge, and through the filtrate passage to the exterior of the filtrate passage.

12. The beverage maker of claim 1 wherein the splash cover includes a cover section and a splash guard removably mounted on the filtrate reservoir, the cover section having a plurality of vent holes and a deflector portion to deflect pressurized liquid into the filtrate reservoir, the splash guard includes a vent and a splash baffle which further defines a surface for deflecting liquid which escapes through the vent holes of the cover section downwardly back into the filtrate reservoir.

13. The beverage maker of claim 12 wherein the splash guard has a lower edge which has spaced fingers, the fingers having projecting tips designed to removably grip the filtrate reservoir for mounting thereon.

14. The beverage maker of claim 1 wherein the device is constructed of plastic microwave transparent material.

15. The beverage maker of claim 1 wherein the particulate substance is coffee grounds.

16. A method for making individually-sized servings of heated beverages in a microwave oven, the method comprising the steps of:

filling at least a portion of a self-contained filter compartment with a particulate substance, the filter compartment having at least one filter for holding a particulate substance while permitting the passage of liquid and steam;

placing the filter compartment within a water reservoir, the water reservoir being integrally connected with a filtrate reservoir which forms a drinking cup, the filter compartment being generally located within the water reservoir;

engaging a bottom cover to the water reservoir so as to form an apparatus capable of serving as a drinking cup and to hold the liquid within the water reservoir;

attaching a removable splash cover to the top of the filtrate reservoir to deflect pressurized liquid into the filtrate reservoir;

placing the combined water reservoir, filtrate reservoir, filter compartment and splash cover into a microwave;

energizing the microwave at predetermined energy levels and predetermined periods of time such that the liquid is pressurized and forms steam, both the pressured liquid and steam are forced through the filter compartment containing the particulate substance and into the filtrate reservoir thereby brewing the heated beverage; and removing the apparatus from the microwave oven for consumption of the heated beverage.

17. The method of claim 16 including the additional step of providing a filter gasket between the filter compartment and the filtrate passage to act as a valve which opens at a predetermined pressure within the filter compartment for the flow of liquid or steam from the filter compartment into the filtrate passage.

18. The method of claim 16 including the additional step of providing means for pressure relief to release pressurized liquid and steam from the water reservoir in the event the pressure in the water reservoir exceeds a predetermined level.

19. The method of claim 16 wherein the filter compartment is removable from the water reservoir and including the steps of removing a filter compartment from the water reservoir, filling at least a portion of the filter compartment with the particulate substance, and reinserting the filter compartment into the water reservoir for the operation of the brewing process.

20. The method of claim 19 wherein the filter compartment includes an upper filter and a lower filter with the particulate substance positioned intermediate the filters.

21. The method of claim 16 wherein the filter compartment includes an integrally molded lower filter having a substantially cylindrical distribution port extending from the lower filter into the interior of the filter compartment, the flow distribution port having an open bottom and at least one elongate slot to distribute the flow of liquid into the central portion of the filter compartment.

22. The method of claim 16 wherein the components are constructed of plastic microwave-transparent material.

23. The method of claim 16 wherein the particulate substance is coffee grounds.

* * * * *